United States Patent
Hodge

(10) Patent No.: US 6,174,340 B1
(45) Date of Patent: Jan. 16, 2001

(54) ROOM AIR CLEANER WITH REMOVABLE FILTER PANELS

(76) Inventor: Joseph Hodge, 2249 Hwy. 50, Batavia, OH (US) 45103

(*) Notice: Under 35 U.S.C. 154(b), the term of this patent shall be extended for 0 days.

(21) Appl. No.: 09/273,707

(22) Filed: Mar. 22, 1999

(51) Int. Cl.[7] ............................. B01D 29/50; B01D 29/56
(52) U.S. Cl. ......................... 55/385.1; 55/467; 55/471; 55/482; 55/486; 55/511
(58) Field of Search .................... 55/385.1, 467, 55/471, 472, 482, 486, 511; D23/364, 377

(56) References Cited

U.S. PATENT DOCUMENTS

| | | |
|---|---|---|
| D. 350,191 | 8/1994 | Tsuji . |
| D. 402,356 | 12/1998 | Hodge . |
| 2,347,334 * | 4/1944 | Schmieg ................................. 55/471 |
| 3,812,370 | 5/1974 | LaViolette . |
| 4,676,721 | 6/1987 | Hardee . |
| 4,749,390 | 6/1988 | Burnett et al. . |
| 5,266,090 | 11/1993 | Burnett . |
| 5,525,145 | 6/1996 | Hodge . |
| 5,641,343 | 6/1997 | Frey . |
| 5,690,719 | 11/1997 | Hodge . |
| 5,837,020 | 11/1998 | Cartellone . |

FOREIGN PATENT DOCUMENTS

| | | | |
|---|---|---|---|
| 438532 * | 3/1925 | (DE) ........................................ | 55/471 |
| 8800812 * | 10/1989 | (NL) .................................... | 55/385.1 |

OTHER PUBLICATIONS

"http://www.lightingcenterinc.com/pix7.htm", The Lighting Center, Inc., Internet Web Page.

"http://www.etropolis.com/ipn/ipnreces.htm", IPN Lighting Recessed Lighting Trims, Dec. 8, 1997, Internet Web Page.

* cited by examiner

Primary Examiner—David A. Simmons
Assistant Examiner—Robert A. Hopkins
(74) Attorney, Agent, or Firm—Steven J. Rosen

(57) ABSTRACT

A room air filter apparatus includes a multi-sided housing having longitudinally spaced first and second ends, a plurality of sides between the first and second ends, and a plenum inside the housing. Each of the sides has an empty space frame by outer edges of the housing side. A fan is mounted to the housing and is operably disposed, preferably, within the plenum to draw air from the plenum and to exhaust the air outside of the housing. Filter panels are removably attached to the outer surfaces of the edges and filter material is mounted in the panels to cover the empty spaces. Magnets mounted on edges of the panels may be used as attachment devices as well as other devices for clipping the panels onto the outer surfaces of the edges of the housing. The filter material is preferably a self-charging electrostatic washable material.

17 Claims, 5 Drawing Sheets

ROOM AIR CLEANER WITH REMOVABLE FILTER PANELS

BACKGROUND OF THE INVENTION

1. Field of the Invention

This invention relates generally to room air cleaners and filtering apparatus for filtering air in a room, and, more particularly, to room air filtering apparatuses with removable filter panels.

2. Description of Related Art

Room air cleaners and room air filtering apparatus are widely used in homes and offices. It is desirable to slowly pass unfiltered air through filtering material in order to maximize the filtering effect. However, it is also desirable that the air be filtered as quickly as possible in order to minimize the time needed to filter the air in a given room and minimize the size of the room air filtering apparatus. A solution to these conflicting goals is to provide a large surface area for the filtering material through which the unfiltered air travels.

In order to increase the surface area of the filtering material without unduly adding to the size of the filtering device, multi-sided filtering units and circular filtering units have been devised. In these units, the entire perimeter of the filtering device houses filtering material, thereby, maximizing the area of the filtering material in relation to the size of the filtering device.

One such filtering device is described in connection with U.S. Pat. No. 4,749,390 to Burnett et al. In this device, each of the four sides of the filtering device houses one or two frames holding the filtering media. The structure of the filtering device and the containers for the filtering media are somewhat complex to manufacture and require the users to change the filter material. Therefore, this device is relatively expensive to manufacture and operate.

Similarly, with present-day circular filters, the filtering media is housed in a cylindrical container, much like a carburetor air filter. These units also are expensive due to the complexity in constructing the unit to receive replaceable filters. Additionally, the cost of the filter media is relatively high, especially if odor adsorbents are included. The consumer is also given very little choice in filtering materials since the high cost of manufacturing requires high volume production levels of selected products.

Therefore, a need has arisen in the industry for an apparatus and method for filtering air using a multi-sided air filter with a reduced cost of construction and operation using washable filter materials. There is also a need for apparatuses to be easy to construct, use, and maintain. It is also highly desirable that the room filtering apparatus be aesthetically pleasing to the eye and not an eyesore and to have decorative features that are useful as well.

The room filtering apparatus should allow for maximum airflow through the filtering element, particularly, for electrostatic self-charging filter materials to permit proper operation and maximum filtering efficiency. The room filtering apparatus should be designed for easy and unobtrusive placement in the room.

SUMMARY OF THE INVENTION

A room air filter apparatus includes a multi-sided housing having longitudinally spaced first and second ends, a plurality of sides between the first and second ends, and a plenum inside the housing. Each of the sides has an empty space framed by outer edges of the housing side. A fan is mounted to the housing and is operably disposed, preferably, within the plenum to draw air from the plenum and to exhaust the air outside of the housing. Filter panels are mounted on the sides. Each of the panels is removably attached to outer surfaces of the edges and filter material is mounted in the panels to cover the empty spaces. Attachment devices are used to removably attach the filter panels to the sides and hold the filter panels against the outer surfaces of the edges. Magnets mounted on edges or the panels may be used as attachment devices as well as other devices for clipping the panels onto the outer surfaces of the edges of the housing. The filter material is preferably a self-charging electrostatic washable material.

One embodiment of the present invention includes a lamp mounted to and outside of the housing, preferably, on top of the housing. Another embodiment has a ceiling fan assembly including a ceiling fan motor mounted to and, preferably, below the housing and the room filter includes a ceiling mount for mounting and suspending the housing from a ceiling. The room filter apparatus can be sized and adapted for use in a car and include an automobile power cord with a cigarette lighter adapter connected to the fan to power the fan.

In a more particular embodiment, the panels have a filter frame with sidewalls between an open front end and an open back end. The filter frame has a channel with channel wall elements extending generally perpendicular to and inwardly of the sidewalls such that the channel opens inwardly of the sidewalls. A grill and a first sheet of the filter material behind the grill are peripherally disposed within the channel. The filter material is a preferably self-charging electrostatic washable material such as woven polypropylene.

The foregoing and other features and advantages of the present invention will become more apparent in the light of the following description and accompanying drawings.

ADVANTAGES OF THE INVENTION

The room air filter apparatus of the present invention has the advantages of being easily and inexpensively constructed and operated. The washable filter materials that may be used in the present invention allows for reduced costs of operation and maintenance. The invention is also more efficient and effective because of the ease of the filter materials that may be washed and/or changed. The room filtering apparatus of the present invention is also aesthetically pleasing to the eye and not an eyesore with decorative features that are useful as well. As part of a lamp assembly or a ceiling fan, it is unobtrusive and provides additional use around the room.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
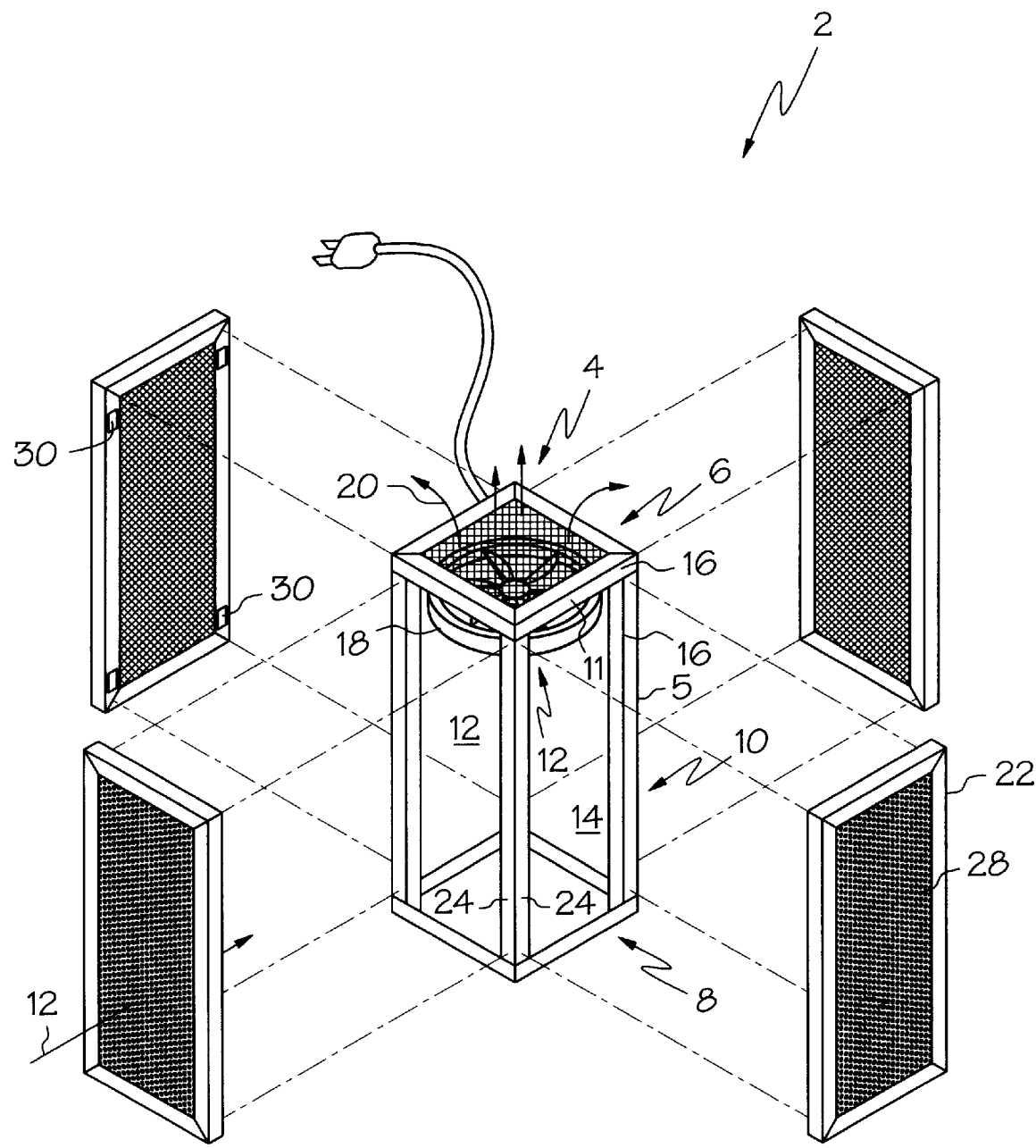
FIG. 1 is an exploded perspective view illustration of an exemplary embodiment of a room air filter apparatus of the present invention.

Illustrated in FIG. 1 is a room air filter apparatus 2 having a multi-sided housing frame 4 with longitudinally spaced first and second ends 6 and 8, respectively. The housing frame 4 has angled corner members 5 (90 degrees in the illustrated embodiment) that extend longitudinally between the first and second ends 6 and 8, respectively, which are constructed from 90 degree corner angle members 11. A plurality of sides 10 of the housing frame 4 extend between the first and second ends 6 and 8, respectively, forming a plenum 12 inside the housing frame. Each of the sides 10 has an empty space 14 framed by outer edges 16 of the angled corner members 5 and the 90 degree corner angle members 11 of the first and second ends 6 and 8, respectively. An exhaust fan 18 is mounted to the housing frame 4, preferably within the plenum 12, such that it is operably disposed with respect to the plenum to draw air 20 from the plenum and to exhaust the air outside of the housing frame. Filter panels 22 are mounted on the sides 10. Each of the panels 22 is removably attached to outer surfaces 24 of the edges 16. A first filter material 28 mounted in the panels covers the empty spaces 14 and filters air drawn into the plenum 12 by the exhaust fan 18.

Magnets 30 are preferably used as attachment devices used to removably attach the filter panels 22 to the sides 10 and hold the filter panels against the outer surfaces 24 of the edges 16. Other attachment devices are well known in the industry and include, but are not limited to, screws, velcro, snaps, and other removable fasteners. The magnets 30 are mounted on edges 16 of the panels 22. Other types of attachment devices may be used such as ones that clip the panels 22 onto the outer surfaces 24 of the edges 16 of the housing frame 4. The first filter material 28 is preferably a self-charging electrostatic washable material such as polypropylene 32.

Figure 2:
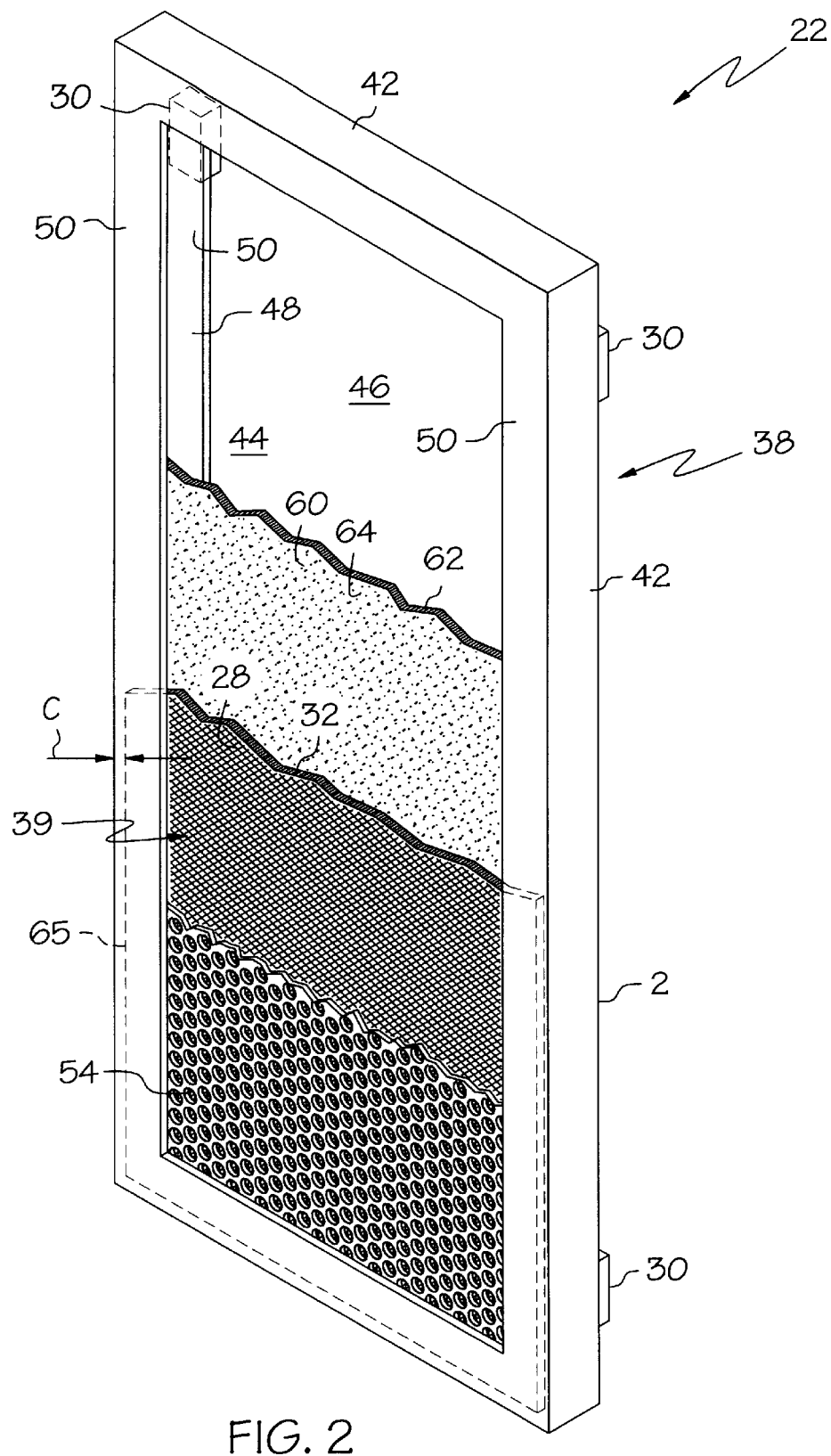
FIG. 2 is a partially cutaway perspective view illustration of a filter panel in FIG. 1.

Referring to FIG. 2, the panels 22 in the embodiments illustrated herein preferably include a filter frame 38 which contains and supports a first sheet 39 of the self-charging electrostatic washable material polypropylene 32. The filter frame 38 has four sidewalls 42 between and defining an open front end 44 and an open back end 46. The filter frame 38 includes a channel 48 bounded by channel wall elements 50 extending generally perpendicular to and inwardly of the sidewalls 42 such that the channel opens inwardly of the sidewalls. The first sheet 39 of filter material 28 is disposed at the front end 44 of the filter frame 38 behind a decorative grill 54 wherein both the first sheet and the grill are peripherally disposed within the channel 48 as might be more completely seen. A second sheet 60 of a second filter material 62 may also be disposed in the channel 48 behind the first sheet 39 of the first filter material 28. The second filter material 62 preferably includes activated charcoal 64 for further air filtration, air purification, and odor removal.

The filter material 28 is preferably a self-charging electrostatic washable material and the grill 54 and the first sheet 39 of filter material are sized and are sufficiently flexible so as to be removably insertable into the channel 48. The grill 54, the first sheet 39, and the second sheet 60 (if used) are easily removed and inserted into the channel 48 by constructing and sizing the grill and the first and second sheets to have a clearance C with the sidewalls 42 all around the filter frame 38. The grill 54 may be made of plastic or metal. If made of metal, it may be sized a bit smaller than if made of plastic so as to allow placement by positioning at different angles to slide the grill 54 into the channel 48 of the filter frame.

Different types of filter material 28 are commercially available and is preferably made of a self-charging electrostatic filter material that is cleanable by a simple washing and may be ordered in a specified size. Such a filter material 28 may be made of a woven polypropylene and the first sheet 39 is preferably formed with reinforced edges 65 such that the first sheet of the filter material can support its own weight within and outside of the filter frame 38. The reinforced edges provide the first sheet with additional structural rigidity so that is can be more easily slid into the channel 48. In the case of the filter material 28 being made of woven polypropylene and the reinforced edges 65 may be heat sealed edges to provide the reinforcement. See U.S. Pat. Nos. 5,525,145 and 6,590,719 by the present inventor for further details on the panels 22.

Figure 3:
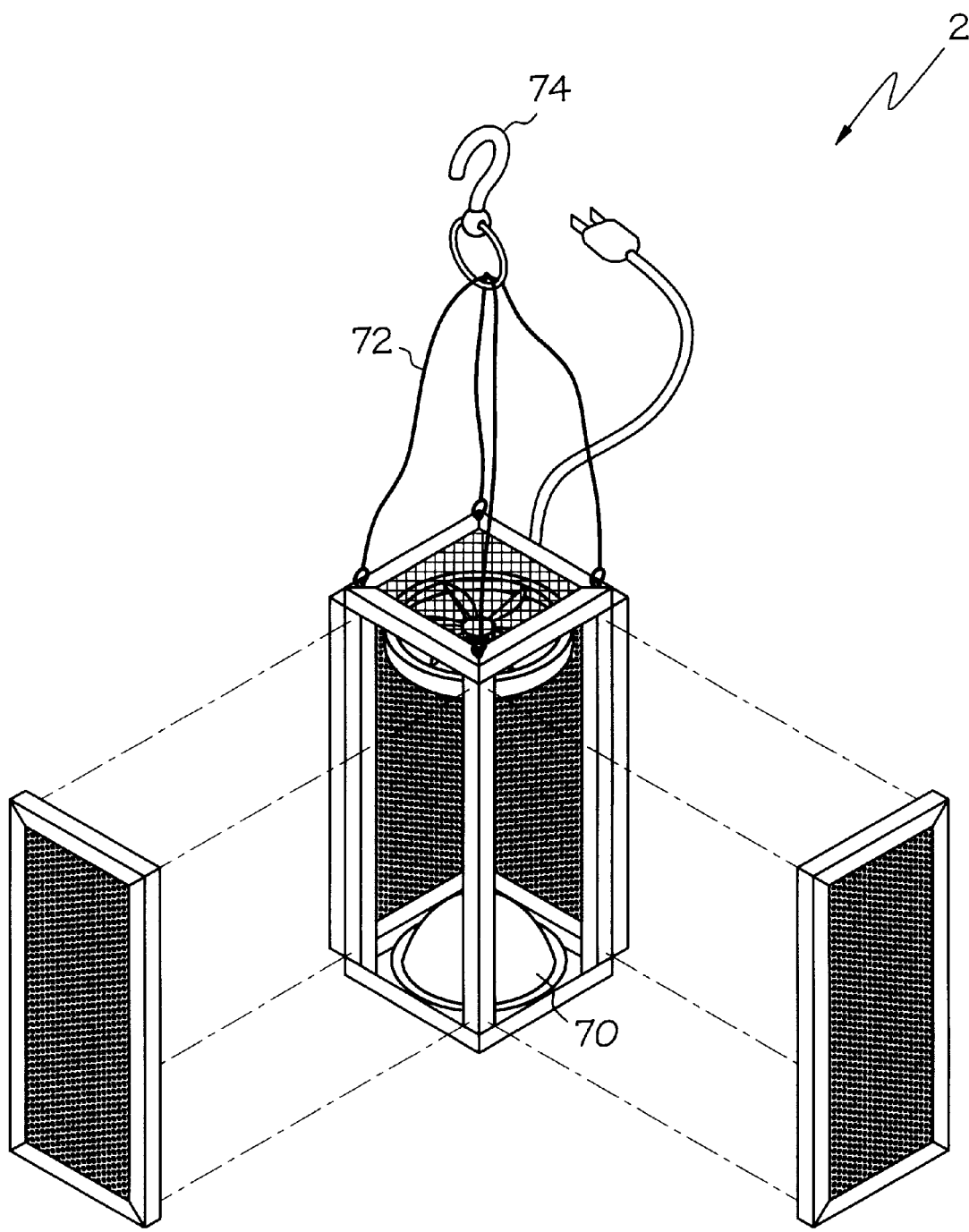
FIG. 3 is a partially exploded perspective view illustration of a second embodiment of a room air filter apparatus of the present invention incorporating a suspended light.

The room air filter apparatus 2 incorporates additional functional features in other embodiments of the present invention. FIG. 3 illustrates the room air filter apparatus 2 having an overhead light fixture 70 mounted to the second end 8 and a mounting means exemplified by chains 72 suspended from a hook 74 attached to the first end 6 to mount and suspend the said housing frame 4 from a ceiling. Various types of overhead lighting fixtures are known in the industry and include, but are not limited to, recessed fixtures.

Figure 4:
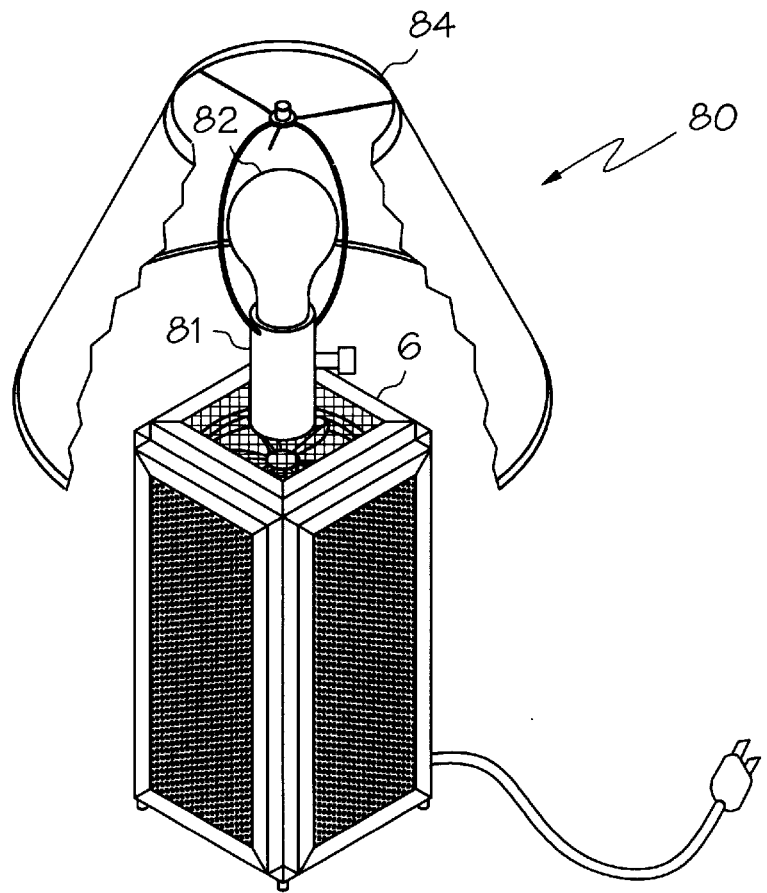
FIG. 4 is a partially exploded perspective view illustration of a third embodiment of a room air filter apparatus of the present invention incorporating a lamp apparatus.

FIG. 4 illustrates the room air filter apparatus 2 having a lamp assembly 80 including a lamp fixture 81 for holding a light bulb 82 and lamp shade 84. The lamp fixture 81 is mounted on the first end 6 and holds the bulb 82 which in turn supports the lamp shade 84.

Figure 5:
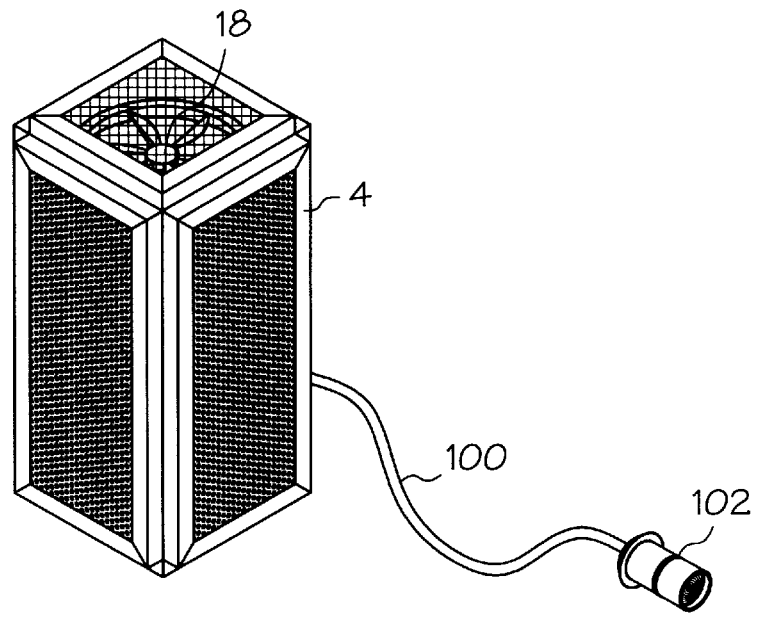
FIG. 5 is a partially exploded perspective view illustration of a fourth embodiment of a room air filter apparatus of the present invention designed for use in an automobile.

FIG. 5 illustrates the room air filter apparatus 2 sized and adapted for use in an automobile and includes an automobile power cord 100 with a cigarette lighter adapter 102 connected to the exhaust fan 18 to power the exhaust fan. The lamp fixture 81 is mounted on the first end 6 and holds the bulb 82 which in turn supports the lamp shade 84.

Figure 6:
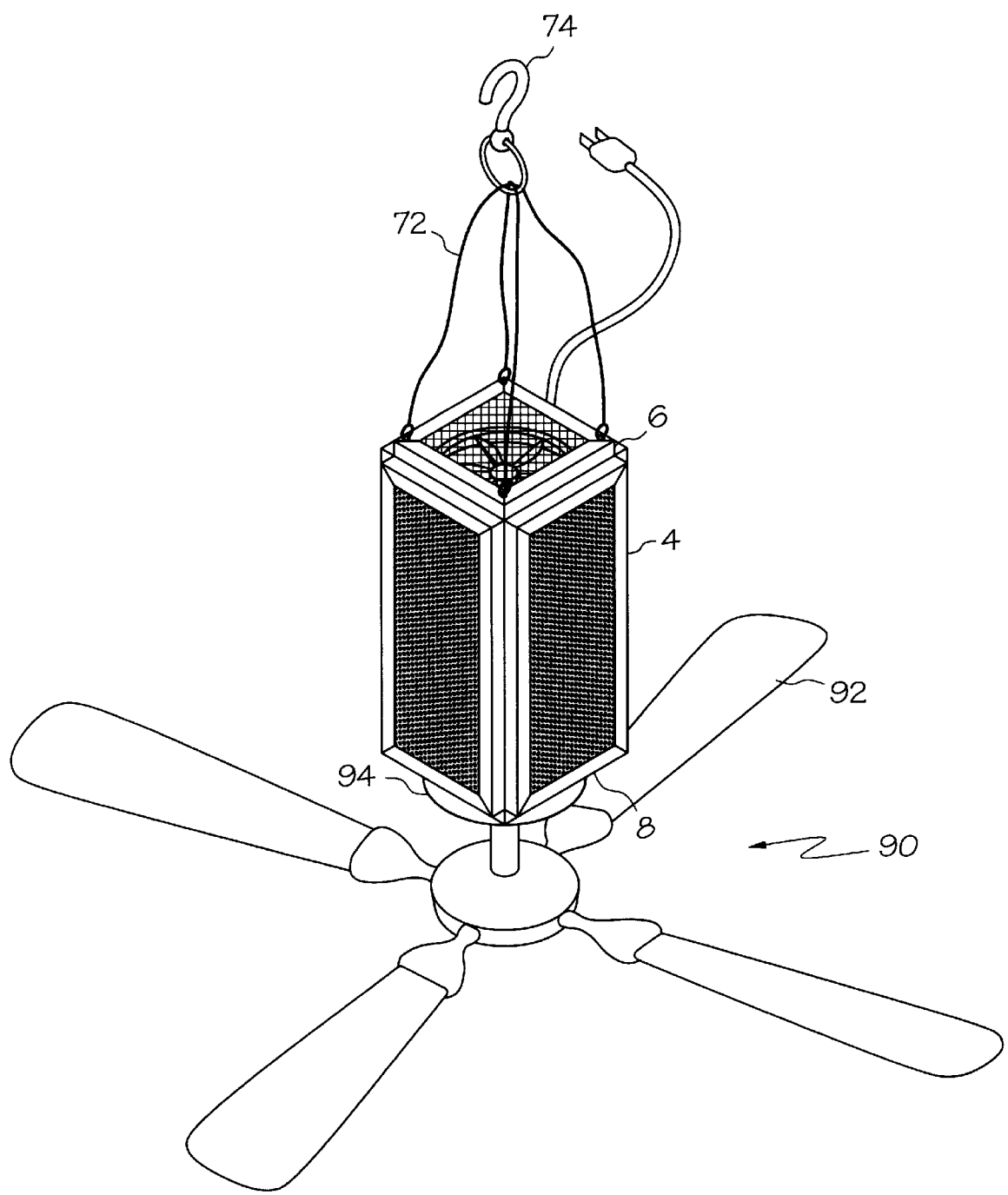
FIG. 6 is a partially exploded perspective view illustration of a fifth embodiment of a room air filter apparatus of the present invention incorporating a suspended ceiling fan.

FIG. 6 illustrates the room air filter apparatus 2 having a ceiling fan assembly 90 including paddles 92 turned by a ceiling fan motor 94 mounted to, and preferably below, the second end 8 of the housing 4. A mounting means such as the chains 72 suspends the housing 4 from the ceiling by the hook 74 attached to the first end 6 of the housing.

While the preferred embodiment of the invention has been described fully in order to explain its principles, it is understood that various modifications or alterations may be made to the preferred embodiment without departing from the scope of the invention as set forth in the appended claims.

I claim:

1. A room air filter apparatus comprising:

a multi-sided housing frame having longitudinally spaced first and second ends, a plurality of sides between said first and second ends, a plenum inside said housing frame, each of said sides having an empty space framed by edges of said each of said sides, an exhaust fan mounted to said housing frame and operably disposed to draw air from said plenum and to exhaust the air through said first end, filter panels on said sides, each of said panels removably attached to outer surfaces of said edges, filter material mounted in said panels to cover said empty spaces wherein said filter material is a self-charging electrostatic washable material, attachment means to removably attach said filter panels to said sides and hold said filter panels against said outer surfaces of said edges, and a lamp fixture and shade assembly mounted to and outside of said housing frame.

2. A room air filter apparatus comprising:

multi-sided housing frame having longitudinally spaced first and second ends, a plurality of sides between said first and second ends, a plenum inside said housing frame, each of said sides having an empty space framed by edges of said each of said sides, an exhaust fan mounted to said housing frame and operably disposed to draw air from said plenum and to exhaust the air through said first end, filter panels on said sides, each of said panels removably attached to outer surfaces of said edges, filter material mounted in said panels to cover said empty spaces wherein said filter material is a self-charging electrostatic washable material, attachment means to removably attach said filter panels to said sides and hold said filter panels against said outer surfaces of said edges, and a ceiling fan including ceiling fan motor, said ceiling fan mounted to said second end to be suspended and below said housing frame.

3. The room filter apparatus of claim 2, further comprising mounting means attached to said second end to mount and suspend said housing frame from a ceiling.

4. An air filter apparatus comprising:

a multi-sided housing frame having longitudinally spaced first and second ends, a plurality of sides between said first and second ends, a plenum inside said housing frame, each of said sides having an empty space framed by edges of said each of said sides, an exhaust fan mounted to said housing frame and operably disposed to draw air from said plenum and to exhaust the air through said first end, filter panels on said sides, each of said panels removably attached to outer surfaces of said edges, filter material mounted in said panels to cover said empty spaces wherein said filter material is a self-charging electrostatic washable material, attachment means to removably attach said filter panels to said sides and hold said filter panels against said outer surfaces of said edges, and said housing frame is sized for use in a car and includes an automobile power cord with a cigarette lighter adapter connected to said fan to power said exhaust fan.

5. A room air filter apparatus comprising:

a multi-sided housing frame having longitudinally spaced first and second ends, a plurality of sides between said first and second ends, a plenum inside said housing frame, each of said sides having an empty space framed by edges of said each of said sides, an exhaust fan mounted to said housing frame and operably disposed to draw air from said plenum and to exhaust the air through said first end, filter panels on said sides, each of said panels removably attached to outer surfaces of said edges, filter material mounted in said panels to cover said empty spaces wherein said filter material is a self-charging electrostatic washable material, attachment means to removably attach said filter panels to said sides and hold said filter panels against said outer surfaces of said edges, and an overhead light fixture mounted to said second end.

6. The room filter apparatus of claim 5, further comprising mounting means attached to said first end to mount and suspend said housing frame from a ceiling.

7. A room air filter apparatus comprising:

a multi-sided housing frame having longitudinally spaced first and second ends, a plurality of sides between said first and second ends, a plenum inside said housing frame, each of said sides having an empty space framed by edges of said each of said sides, an exhaust fan mounted to said housing frame and operably disposed to draw air from said plenum and to exhaust the air through said first end, filter panels on said sides, each of said panels removably attached to outer surfaces of said edges, filter material mounted in said panels to cover said empty spaces, attachment means to removably attach said filter panels to said sides and hold said filter panels against said outer surfaces of said edges, each of said panels comprising a filter frame having sidewalls between an open front end and an open back end and said filter frame having a channel with channel wall elements extending generally perpendicular to and inwardly of said sidewalls such that said channel opens inwardly of said sidewalls, a mounting means attached to said first end for mounting and suspending said housing frame from a ceiling, and a first sheet of said filter material behind a grill, both of which are peripherally disposed within said channel.

8. The room filter apparatus of claim 7, wherein said filter material is a self-charging electrostatic washable material.

9. The room filter apparatus of claim 8, wherein said attachment means comprises magnets on said edges.

10. The room filter apparatus of claim 8, wherein said attachment means comprises magnets on said filter panels.

11. The room filter apparatus of claim 8, further comprising a lamp mounted to and outside of said housing frame.

12. The room filter apparatus of claim 8, further comprising an overhead light fixture mounted to said second end.

13. The room filter apparatus of claim 8, wherein said grill and first sheet of filter material are sized and sufficiently flexible so as to be removably insertable into said channel.

14. The room filter apparatus of claim 13, further comprising a second sheet of a second filter material disposed in said channel behind said first sheet of filter material.

15. The room filter apparatus of claim 14, wherein said second filter material includes activated charcoal.

16. The room filter apparatus of claim 15 wherein said filter material comprises a woven polypropylene.

17. The room filter apparatus of claim 16 wherein said first sheet of said woven polypropylene has heat sealed finished edges such that said filter material can support its own weight within said filter frame.

* * * * *